Jan. 7, 1964
F. S. LACEY
3,116,618
SLIP CLUTCH
Filed June 4, 1962
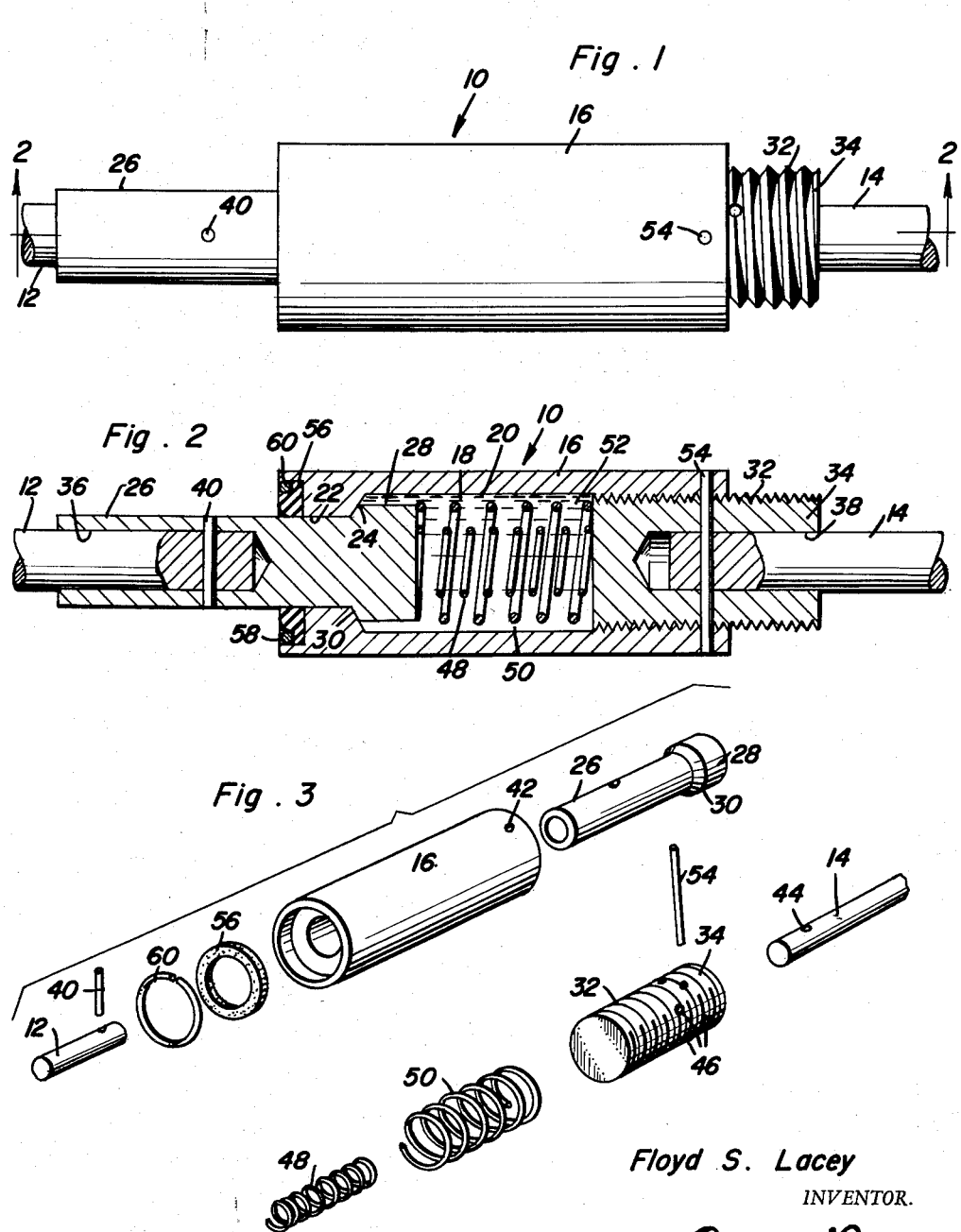
Floyd S. Lacey
INVENTOR.
BY

United States Patent Office 3,116,618
Patented Jan. 7, 1964

3,116,618
SLIP CLUTCH
Floyd S. Lacey, R.F.D., Onslow, Iowa, assignor of fifty percent to Earl H. Neumann, Hillsdale, Ill.
Filed June 4, 1962, Ser. No. 199,842
5 Claims. (Cl. 64—30)

This invention relates to coupling devices, and more particularly to a clutch for connecting two rotating shafts which is adapted to slip when the torque being transmitted between the shafts exceeds a predetermined amount.

Accordingly, it is the primary object of the invention to provide a slip clutch of an improved design.

It is another object of the invention to provide a slip clutch having improved means for adjusting the torque capacity thereof.

It is another object of the invention to provide a slip clutch having an adjusting means for varying the torque capacity thereof, the adjusting means also functioning as a coupling for connecting the clutch to a shaft, and adjusting means permitting the torque capacity of the clutch to be varied without changing the effective length of the clutch.

It is another object of the invention to provide a slip clutch having a driven member of small inertia and wherein the clutch surfaces are continually bathed in cooling and lubricating fluid to prevent damage to the clutch surfaces. The fluid also functions as a preservation to prevent oxidation and corrosion of the clutch parts.

It is yet another object of the invention to provide a slip clutch adapted for universal use, but particularly designed to be connected to the drive shaft of an outboard motor rather than the propeller shaft.

It is yet another object of the invention to provide an improved slip clutch which is relatively simple in design, economical to manufacture, durable in use and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the invention;
FIGURE 2 is a cross sectional view taken substantially upon the plane of line 2—2 of FIGURE 1; and
FIGURE 3 is an exploded perspective view of the invention.

Referring to the drawings, it can be seen that the slip clutch 10 is so designed as to connect coaxial driving and driven shafts 14 and 12 respectively which are of the same diameter.

The clutch 10 includes a tubular housing 16 having a bore 18 extending substantially therethrough so as to define a clutch chamber 20. The bore 18 terminates short of the left end of the housing, however, a smaller bore 22 concentric with the bore 20 is provided through the left end portion of the housing and the adjacent ends of the bores are connected by a frusto-conical clutch seat or surface 24 which extends at an angle of substantially sixty degrees to the axis of the housing 16.

A cylindrical driven clutch member 26 is journalled in the bore 22 and provided with a head 28 having a tapered or frusto-conical clutch surface 30 parallel to and in frictional engagement with the clutch surface 24.

The right end of bore 18 is provided with threads which mate with the peripheral threads 32 on a cylindrical plug 34 so as to seal one end of the clutch chamber 20. The clutch member 26 and plug 34 are provided with cylindrical bores 36 and 38 respectively for receiving the ends of the driven and driving shafts 12 and 14 respectively. The driven shaft 12 is drivingly connected to the clutch member 26 by means of a radial metal pin 40 which extends through and tightly fits within aligned bores through shafts 12 and member 26.

The right end of cylinder 16 and the left end of valve shaft 14 are provided with radially aligned bores 42 and 44 respectively. The central portion of the plug 34 is provided with a plurality of axially and peripherally spaced diametrical bores 46 of the same diameter as the bores 42 and 44. The outer ends of the bores 46 define a spiral concentric with and at the same pitch as the threads 32 so that any one of the bores 46 may be selectively aligned with the bores 42 and 44.

The opposing ends of the clutch member 26 and plug 34 are highly machined so as to be parallel to one another and perpendicular to the axis of the housing 16 and shafts 12 and 14. After the clutch member 26 has been installed within the housing 16, concentric clutch coil compression springs 48 and 50 are inserted into the chamber 20 as illustrated in FIGURE 2 so as to abut the head 28. The chamber 20 is then filled with 30-weight non-detergent oil 52, and the plug 34 is screwed into the bore 18 so as to compress the springs the desired amount. The ends of the springs are perpendicular of their horizontal axes in their uncompressed condition. Thus, the spring 50 acts as a stabilizing spring against the head 28 and maintains the member 26 in a position parallel with the axis of the cylinder of the housing 16. After the plug 34 has been rotated sufficiently to properly compress the springs 48 and 50, a pin 54 is inserted through the bore 42, one of the bores 46 in alignment with the bore 42 and the bore 44 in drive shaft 14 so as to rigidly secure the drive shaft and plug to the clutch housing 16.

After the clutch is assembled as explained above, an annular neoprene seal 56 is installed on the clutch member 26 and forced into an annular recess within the left end of the housing 16. The outer end of the recess is partially closed by an annular lip 58. Seal 56 is maintained and compressed within the recess of housing 16 by means of a resilient split ring 60 which is maintained in position by the lip 58.

Although the clutch 10 may be used to drive the blade of a rotary lawn mower, to drive electric fans and for many other purposes, it is particularly useful when connected to the drive shaft of an outboard motor whereby if the propeller thereof strikes a rigid object, the clutch may slip thus preventing damage to the propeller and various components of the motor. When the propeller or other object driven by the driven shaft 12 is stopped or overloaded so that torque beyond a predetermined degree is transmitted through the coupling or clutch 10, then the clutch member rotates relative to the clutch housing 16 so that the surfaces 24 and 30 slip relative to one another. Normally the torque is transmitted from the housing 16 to the member 26 through the conical frictional surfaces, the pressure therebetween and the amount of torque transmitted between these surfaces being determined by the degree of compression of the springs 48 and 50. During slippage of the clutch, the lubricating oil 52 prevents the conical surfaces 24 and 30 from overheating and thereby damaging the clutch.

The entire clutch with the exception of the seal 56 is composed of metal and the housing 16 is preferably composed of steel or brass.

It is to be noted that the compression of the spring may be varied by removing the pin 54 and rotating the plug 34 so that the springs are compressed to the desired degree and then reinserting the pin through the bores 42 and 44 and one of the bores 46 in alignment therewith.

This specific means of adjustment permits the driving and driven shafts 14 and 12 to always remain at a predetermined spaced distance apart since the plug 34 merely slides on the end of the shaft 14 during the adjustment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An overload release clutch comprising an elongated hollow clutch housing enclosing an elongated clutch chamber, a transversely extending first clutch surface connected to one end of said housing within one end of said chamber, a clutch member journalled in said one end of said housing and provided with a second clutch surface complementary to and engaging said first clutch surface, an abutment threadedly engaged with the other end of said housing and adjustable axially of the latter, spring means compressed between said abutment and said second clutch member so as to urge said clutch surfaces into frictional engagement with a predetermined force, the end of said abutment remote from said clutch member having an axial passage therein adapted to receive an end of a drive shaft, a plurality of diametrical bores extending through said abutment, the ends of said bores defining a spiral path of the same pitch as the threads on said abutment, a pin extending through a transverse bore in the other end of said housing and one of said diametrical bores in said abutment.

2. A clutch as defined in claim 1 wherein said spring means comprises a pair of concentric coil springs of different diameters.

3. An overload release clutch comprising an elongated hollow clutch housing enclosing an elongated clutch chamber, a transversely extending first clutch surface connected to one end of said housing within one end of said chamber, a clutch member journalled in said one end of said housing and provided with a second clutch surface complementary to and engaging said first clutch surface, an abutment threadedly engaged with the other end of said housing and adjustable axially of the latter, spring means compressed between said abutment and said second clutch member so as to urge said clutch surfaces into frictional engagement with a predetermined force, the end of said abutment remote from said clutch member having an axial passage therein adapted to receive an end of a drive shaft, a plurality of diametrical bores extending through said abutment, the ends of said bores defining a spiral path of the same pitch as the threads on said abutment, a pin extending through a transverse bore in the other end of said housing and one of said diametrical bores in said abutment, said clutch member extending through said one end of said housing and is provided with an axial passage for a driven shaft coaxial with and of the same diameter as said first mentioned axial passage.

4. A clutch as defined in claim 3 wherein said one end of said housing is provided with a recess containing a seal frictionally engaging said clutch member, and said clutch surfaces being frusto-conical.

5. A clutch as defined in claim 3 wherein said chamber is filled with oil.

References Cited in the file of this patent

UNITED STATES PATENTS

| 923,043 | Gulick | May 25, 1909 |
| 1,039,125 | Hardy | Sept. 24, 1912 |
| 1,503,446 | Hedglon | July 29, 1924 |
| 2,323,355 | Ricciardi | July 6, 1943 |
| 2,335,574 | Thompson et al. | Nov. 30, 1943 |
| 2,527,517 | Barker et al. | Oct. 31, 1950 |
| 2,974,503 | Newton | Mar. 14, 1961 |